April 3, 1962 E. J. RENNER Re. 25,151

BELT CONVEYORS

Original Filed June 19, 1959 2 Sheets-Sheet 1

$F_T = F_R - F_L$
$= \frac{P}{2}K - \frac{P}{2}K + (P-B)K$
$= (P-B)K$ $F_T = F_R - F_L$
$= (P-B)K$ Inventor
Elmer J. Renner
By Mann, Brown & McWilliams,
Attys.

BELT CONVEYORS

Original Filed June 19, 1959 2 Sheets-Sheet 2

Inventor
Elmer J. Renner
By Mann, Brown and McWilliams
Attys.

United States Patent Office

Re. 25,151
Reissued Apr. 3, 1962

25,151
BELT CONVEYORS

Elmer J. Renner, Aurora, Ill., assignor to Stephens-Adamson Mfg. Co., a corporation of Illinois Original No. 2,966,065, dated Dec. 27, 1960, Ser. No. 821,474, June 19, 1959. Application for reissue July 10, 1961, Ser. No. 126,798
9 Claims. (Cl. 74—241)

Matter enclosed in heavy brackets [ ] appears in the original patent but forms no part of this reissue specification; matter printed in italics indicates the additions made by reissue.

This invention is a continuation-in-part of my copending application Serial No. 733,139, now abandoned, filed May 5, 1958.

This invention relates to belt conveyors and particularly to self-training pulleys for use in such belt conveyors.

In belt conveyors, it is of course essential that the belt run in a properly centered or aligned relationship with respect to the supporting and driving pulleys of the conveyor, and as a means for attaining this centered relationship of the conveyor belt, efforts have been made to use the well-known principles of crown pulleys following the teachings employed in line shaft belt drives for many years. In applying this principle of the crown pulley to belt conveyors, the cost of machining or otherwise forming a radius crown was prohibitive, so that it was necessary to make such conveyor pulleys with tapered surfaces that could be formed from a tubular shell by a rolling operation. Even when thus formed the tapered conveyor pulleys involved high production costs.

In order to attain a good training of the belt, it was necessary to employ a fairly steep taper, and in time it developed that such steep taper had harmful effects on the belt. This resulted from the greatly increased pulley diameter at the midpoint as compared with the pulley diameter at the edge, and this caused a corresponding stretch of the belt at its midpoint. Such excessive stretch in the central portion of the belt resulted in rapid deterioration of the belts that were thus used with self-training tapered conveyor pulleys. The resulting complaints of belt manufacturers led to progressive reduction of the taper employed in conveyor pulleys so that in present day pulleys the taper is as low as 1/16″ to 1/10″ per foot of taper.

Thus, in the development of the art, the two comprises adopted in changing from a radius crown to a taper, and in reducing the angle or slope of the taper, have resulted in a material sacrifice in the desired training effect that is attained.

In view of the foregoing, it is the primary object of the present invention to enable self-training of conveyor belts to be attained with minimum of stretching and distortion of the belts, and a related object is to enable such self-training action to be attained through the use of pulleys that are simple and economical in structure.

In self-training belt conveyors as heretofore used, the fatiguing forces applied to the belt as an incident to the cooperation of the belt with the crown pulley have been concentrated to a large extent in the central areas of the belt where the wear due to the application of the load is also concentrated, and as a result of this, the useful life of the conveyor belts has been reduced. It is therefore a further object of the present invention to enable self-training of the belt of a belt conveyor to be attained in such a way as to segregate the fatiguing forces that are generated in the course of the self-training operation from the fatiguing forces and wear caused by the carrying of the load on the conveyor belt.

More specifically, it is an object of this invention to enable increased and highly effective belt-training forces to be developed by tapered conveyor pulleys in such a way as to eliminate excessive and harmful stretching of the belt.

Another object of the present invention is to simplify the production of self-training pulleys of the size required in belt conveyors and like installations.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

For purposes of disclosure the invention is herein illustrated as embodied in a conveyor having a self-training pulley 10. The pulley 10 comprises a rim 11 having transverse disks or webs 12 fixed therein adjacent to the ends and having bearing hubs 13 fixed in aligned positions in the webs 12 and disposed in an axial relationship with respect to the rim 11 so that the pulley 10 may be mounted on a supporting shaft for rotation in its position of use.

Figure 8:
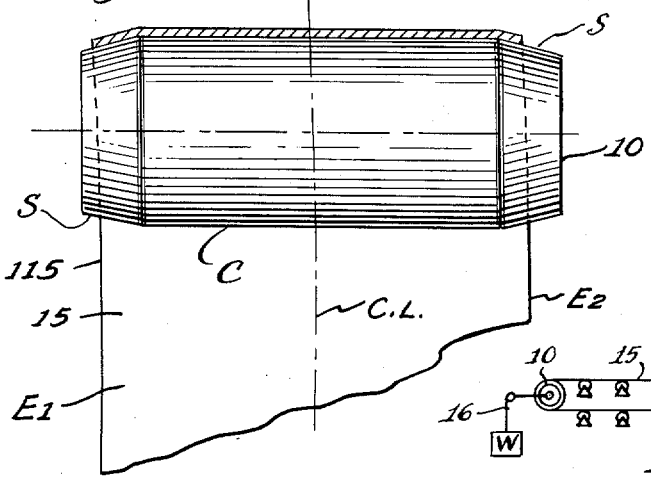
FIG. 8 is a schematic view showing the laterally curved form assumed by a misaligned belt approaching the pulley of the conveyor of this invention.
Figure 8A:
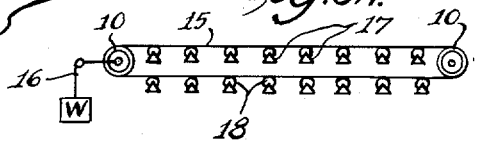
FIG. 8A is a schematic view showing one form of conveyor embodying the invention.

A conventional conveyor belt is utilized in association with the pulley 10 in the manner illustrated diagrammatically in FIG. 8A of the drawings where the endless belt 15 extends about end pulleys 10 that are spaced apart in accordance with the length of the conveyor, and the belt 15 is tensioned by any conventional tensioning means such as a weight and pulley structure 16 acting on one of the pulleys 10. *It will thus be seen that the belt 15 has a substantial wrap around the end pulleys 10.* The upper or working run of the belt 15 is supported at intervals by carriers 17 while the return run of the belt is supported by return carriers 18 of the usual kind. It may be noted that the upper run of the conveyor belt 15 may assume different forms according to the use to which the conveyor belt is to be put, so that the carriers 17 may support the upper run 15 in a flat form or may support the belt in the usual troughed form that is utilized in transporting lump or granular material.

The belt 15 is of the conventional non-metallic kind used in belt conveyors with a fabric and/or corded carcass, such belt may be identified as a ribbon in that it is of uniform thickness throughout its width. To elaborate on the belt characteristics, such conventional belting must be elastic or stretchable in character so that the belt, when drawn to its minimum working tension as required by loading and driving considerations, will be drawn into engagement with the sloping surfaces S of the pulleys 10. The belt 15 also has the usual lateral flexibility to provide for training cooperation and for troughing of the belt. The belt should have a modulus of elasticity in a longitudinal sense that does not substantially exceed one million pounds per square inch.

The self-training function in the present conveyor is attained through cooperation of the stretchable or elastic conveyor belt 15 with the specific form and configuration of the rim 11, as will be described in further detail hereinafter, and in this cooperation the necessary aligning or belt-training forces for maintaining the belt centered on the central plane CP of the rim are produced without excessive stretching, tensioning or flexing of the belt.

Figure 1:
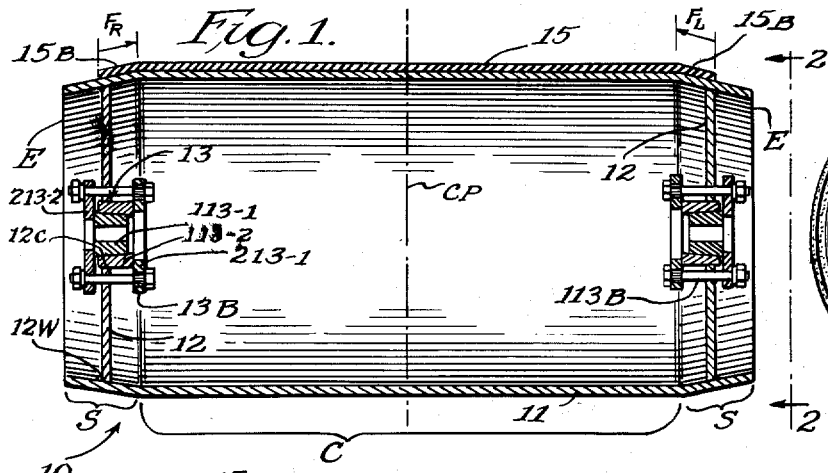
FIG. 1 is an axial sectional view through a self-training pulley embodying the features of the invention, a belt being illustrated in its aligned or properly centered relationship with respect to the pulley rim.
Figure 2:
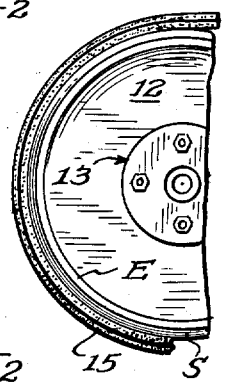
FIG. 2 is an end elevational view taken from the line 2—2 of FIG. 1.
Figure 5:
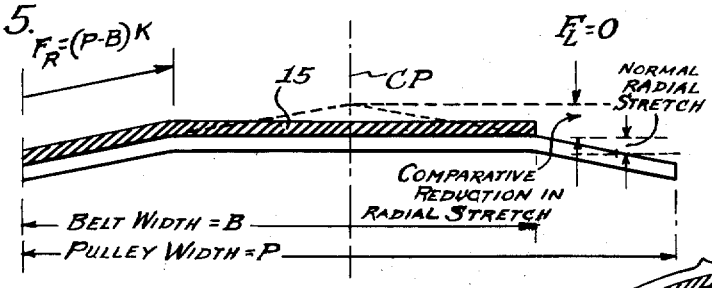
FIG. 5 is a similar view relating to a conveyor having the pulley of this invention.
Figure 7:
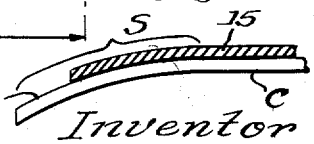
FIG. 7 is a detail view showing the sloping end surfaces formed as an arcuate or radius crown.
Figure 6:
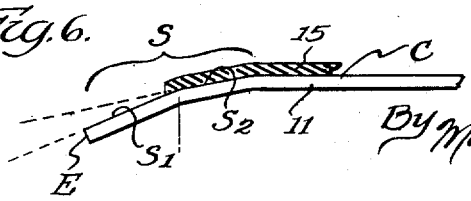
FIG. 6 is a detail view showing the sloping end surfaces of the pulley formed as a compound taper.

Thus, as herein shown, the rim 11 has its outer or belt-engaging surface formed to provide a central cylindrical portion C that extends in opposite directions from the central plane CP for a major proportion of the axial dimension of the rim, and at the ends of the cylindrical portion C, the rim 11 is formed with sloping edge portions S that reduce gradually in diameter to the outermost edges E of the rim. The sloping edge portions S may be formed as a single frusto-conical taper as shown in FIGS. 1, 3 and 5, which constitutes the simplest form of the present invention, or as a compound or double taper $S_1$—$S_2$, as shown in FIG. 6, which constitutes the preferred form of the invention, or with a curved or radius form $S_3$, FIG. 7, as will be discussed in further detail hereinafter.

The rim 11 is of course sized and proportioned for a belt 15 of substantially a predetermined width, and where the maximum rate of self-training response is desired, one of the basic considerations in this regard is that the cylindrical portions C have an axial dimension that is somewhat less than the width of the belt so that when the belt 15 is in a properly centered relationship with respect to the central plane CP of the pulley, border portions 15B, along the edges of the belt 15, will be disposed opposite corresponding portions of the sloping or control surfaces S at opposite edges of the rim 11, and upon sufficient tensioning of the belt 15, these border portions 15B of the belt will be in firm engagement with the sloping surfaces S. Preferably, where the maximum response rate is desired, the belt width is equal to the width of the cylindrical portion C plus the width of one of the sloping portions S.

Figure 3:
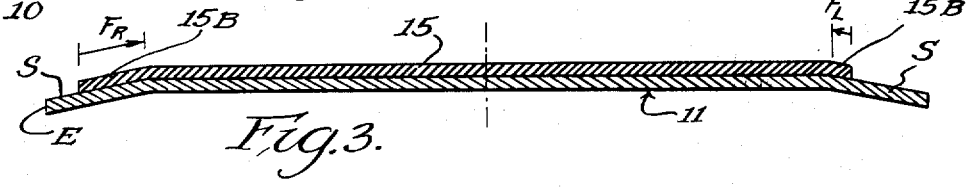
FIG. 3 is a view similar to FIG. 1 illustrating the belt when it is out of alignment with respect to the pulley, and schematically including the opposed corrective forces acting to re-establish proper alignment.

In attaining self-training action, as will be described in further detail hereinafter, it is contemplated that the belt 15 may become displaced laterally from its centered relationship of FIG. 1 to a laterally displaced relation, somewhat like that illustrated in FIG. 3 of the drawings, and when such lateral displacement takes place, it will be noted that the border portion 15B at one edge of the belt remains in engagement with the related sloping surface S so that the width of the engaged border portion 15B at one side of the belt is greater than the width of the engaged border portion 15B at the other edge of the belt, as illustrated in FIG. 3 of the drawings. With this in mind, the lateral dimension of each of the sloping surfaces S is equal substantially to the difference between the rim width and the belt width. When the maximum response rate is desired; or put another way, the lateral dimension of the sloping surfaces S are preferably such that if the belt 15 is displaced laterally so that one edge is located at the juncture of the related surface S with the cylindrical surface C, the other edge of the belt 15 will still be located opposite and in engagement with the other of the sloping surfaces S.

The phenomena of self-training of a belt has been explained in many different ways, but according to my theory of operation it is the border portions 15B of the belt, through cooperation with the sloping surfaces S, which are effective to apply oppositely directed forces to the belt 15 to maintain proper alignment of the belt 15 on and with respect to the rim 11. As herein shown, the engagement of the left-hand end border portion 15B of the belt 15 with the opposed sloping surface S results in a force $F_R$ acting in a right-hand direction as indicated in FIG. 1, while the engagement of the right-hand border portion 15B of the belt with the opposed sloping surface S results in the application of a force $F_L$ in a left-hand direction. These corrective forces vary of course with the belt tension, the degree of slope of the surfaces S and with other factors such as the coefficients of friction of the belt and the pulley face, but in addition, the force, in each instance, varies directly with the width of the border portion 15B that is engaged with the opposed sloping surface S.

As shown in FIG. 1 of the drawings, the belt 15 is located in a centered relationship so that the width of the engaged border portions 15B engaging the respective surface S is the same. The resulting $F_R$ and $F_L$ are therefore equal so that the belt 15, so far as these forces may be concerned, tends to remain in the proper aligned or centered relationship or in respect to the pulley rim 11. If, however, extraneous forces caused, for example, by uneven loading of the belt, cause the belt 15 to become lateraly displaced, as for example, to the left, as illustrated in FIG. 3 of the drawings, the width of the left-hand border portion 15B that is engaged with the opposed sloping surface S becomes relatively greater, while the width of the right-hand border portions 15B that is engaged with the opposing sloping surfaces S becomes relatively smaller. If this occurs, there is a corresponding increase in the right-hand force $F_R$ and a corresponding decrease in the left-hand force $F_L$, as indicated diagrammatically by the force lines in FIG. 3. The difference between these two forces $F_R$ and $F_L$ produces a resultant force, acting in a right-hand direction as viewed in FIG. 3, and tending to cause a corrective shifting of the belt 15 to the right and toward the centered relationship shown in FIG. 1. This resultant corrective force becomes correspondingly smaller as the belt 15 approaches its properly centered or aligned relationship so that when the aligned relationship is reached, the belt 15 tends to remain in this relationship. Thus a self-training action is attained.

Figure 4:
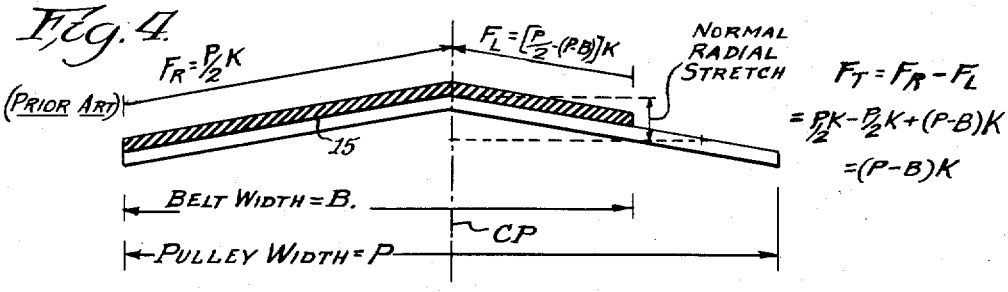
FIG. 4 is a diagrammatic view showing the forces involved when a conventional crown pulley is used.

It has been pointed out hereinbefore that the conveyor pulley of the present invention produces belt-centering or training forces of the desired magnitude even though the required stretching of the belt is substantially reduced under the present invention. In FIGS. 4 and 5, this novel and distinctive functioning of the present pulley has been schematically illustrated and will be described with respect to the simplest form of the present invention where the sloping surfaces S are formed as single taper, and upon the basis of such explanation, it will be hereinafter pointed out that through the use of the double taper $S_1$—$S_2$ of FIG. 6, or the radius crown $S_3$ of FIG. 7, the conveyor pulleys of the present invention produce even greater training forces than prior conveyor pulleys of comparable size and slope. Such distinctive functioning of the conveyor pulley of the invention has been shown by comparing the forces and the stretching involved in a prior art tapered conveyor pulley shown diagrammatically in FIG. 4 and those involved with a pulley of the present invention that is shown diagrammatically in FIG. 5 of the drawings.

The conveyor pulleys of FIGS. 4 and 5 are shown as being of the same width and as being associated with belts of the same width, and in each instance the belt is shown as being displaced fully to the left so that the left-hand edge of the belt coincides with the left-hand edge of the pulley. Keeping in mind that a centering force is produced wherever the belt is in tensioned engagement with a sloping or crowned pulley surface, it will be noted that FIGS. 4 and 5 show graphic force lines $F_R$ and $F_L$ in association with the belts and algebraic representations are shown for each of these forces. In such formulae, a constant "K" is included which takes into account the slope of the surface S, and the other factors that are involved, these factors and the constant "K" being the same for both sides or slopes of the pulleys.

The resultant or effective training force that acts to produce the centering of the belt is in each instance equal to the force $F_R$ minus the force $F_L$, and at the right-hand side of each of the views, the algebraic solution or determination of the resultant training or centering force $F_T$ has been indicated which demonstrates that the resultant or training force $F_T$ is precisely the same with the conveyor pulley of the present invention as it is with the conventional tapered conveyor pulley of FIG. 4, that is of comparable size and which has a comparable slope in the surfaces S.

One theory of operation that has been advanced relative to the action of conventional crown pulleys relates the self-training action to the laterally curved form that is assumed by a misaligned belt as it approaches a crown pulley, and analysis of the present conveyor according to such theory serves to emphasize the different and improved coaction under this invention between the belt and the pulley. Thus, in FIG. 8 of the drawings, the belt 15 is diagrammatically shown in a misaligned relation where it approaches the pulley 10 on an approach curve 115 which has been exaggerated for purposes of emphasis.

According to this theory of the training action, each point in the belt, as it engages the pulley, tends to ride around the pulley in a plane that is normal to the pulley axis, so that restoring or aligning forces are produced. Thus, according to this theory, the aligning forces follow as a direct result of the approach curve 115 that has been produced in the belt 15, and under the present invention the approach curve 115 is created without needless application of destructive stresses and variations of stresses in the belt. The curve 115 that is formed in a misaligned belt 15 as it approaches the pulley 10 is due basically to the reduction in the length of the belt at one edge thereof and the increase in the length of the belt at the other edge, and as an incident to the changes in the relative length of the edges of the belt, the stress pattern in the belt is changed as will be described hereinafter. In FIG. 8 of the drawings the edge E–1 of the belt 15 is the one that is shortened while the edge E–2 is the one that is lengthened.

With respect to the stress pattern in a belt such as the belt 15, it should first be observed that the stress pattern is different in the areas that are in engagement with a crowned pulley as compared with the intermediate portions of the belt, and also it is important to note that the stress pattern is changed after a new belt has been used long enough in association with crown pulleys to have assumed a permanent stretch that is determined by the form of the pulleys with which it is used.

As illustrative of the improved stress patterns that are obtained in the belt of a conveyor of the present invention, FIGS. 9 to 12 have been included in the drawings to illustrate the stress patterns in a belt that is associated with a conventional crown pulley, and FIGS. 13–16 have been shown to similarly illustrate the stress patterns in conveyor belts that are used according to the present invention.

Figure 9:
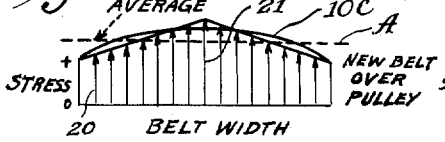
FIG. 9 is a stress diagram showing the longitudinal stresses in a new belt passing over a conventional crown pulley.

Thus, in FIG. 9 of the drawings, a pulley crown surface 10C has been shown in association with a schematic stress diagram showing the stress pattern in a new belt passing over such a crown pulley. The tension that is applied to the belt, as by means of a tensioning mechanism 16, produces an average stress throughout the width of the belt, and this average is indicated at A. The average stress, however, is distributed as a varying stress throughout the width of the belt, so that the stress indicated at 20 near the edges of the belt is substantially less than the stress indicated at 21 at the center of the belt. At the center of the belt the crowned form of the crown pulley has stretched the belt to a considerable extent, while near the edges the belt has been stretched to a substantially smaller degree, and this variation in the stretching of the belt has produced the stress distribution shown in FIG. 9.

Figure 10:
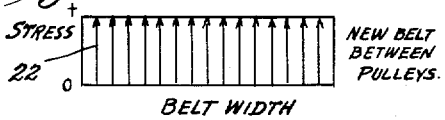
FIG. 10 is a stress diagram showing the longitudinal stresses in a new belt between crown pulleys.

In FIG. 10 the stress distribution between pulleys in such a new belt is shown, and it will be noted that the stress in each increment of width of the belt is the same, as indicated at 22 of FIG. 10.

The stress patterns that are thus produced in a new belt do not, however, prevail indefinitely, for it has been found in practice that the repeated stretching of the belt as it passes over the crown pulley surfaces 10C causes the belt to assume a permanent stretch so that the central portions of the belt are actually somewhat longer than the edge portions of the belt. When thus stretched, the same average tension A is applied to the belt, but the stress pattern in the belt is somewhat different. Thus, as shown in FIG. 11, the stress pattern of the permanently stretched belt at the crown pulley is shown, and the stress near the edges, as indicated at 120, is somewhat greater than is indicated at the corresponding location in FIG. 9, while the stress in the central portions of the belt, as at 121, is somewhat greater than in a new belt, as indicated in FIG. 9.

Figure 12:
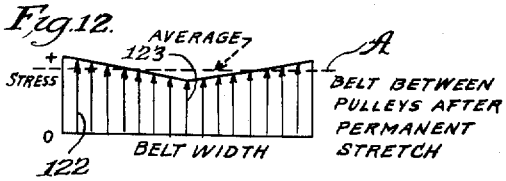
FIG. 12 is a view showing the stresses of the belt of FIG. 11 between pulleys.

The stress pattern in the intermediate portions of the belt is also changed after the belt has assumed permanent stretch, and as shown in FIG. 12, the stress 122 near the edges of the belt has increased as compared with FIG. 10, while the stress 123 in the central portions has been substantially reduced.

Figure 11:
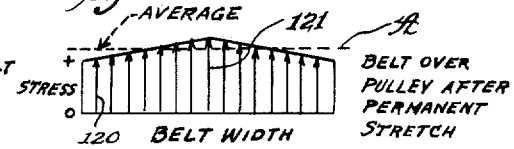
FIG. 11 is a schematic view showing the stresses in a belt passing over a conventional crown pulley after the belt has assumed a permanent stretch.

The stress patterns that have been diagrammatically illustrated in FIGS. 11 and 12 as applied to a conveyor using crown pulleys, are of course representative of the conditions that prevail in the belt throughout most of its useful life, and it will be evident that in each complete revolution of the belt 14, there is substantial change in the stresses in the belt each time the belt passes over one of the pulleys. Thus, as to the center portion of the belt where most of the load and load-carrying wear takes place, the relatively low tension 123 in the run of the belt is substantially increased above the average A as indicated at 121 in FIG. 11 so that this repeated variation in the stress in the central portion of the belt contributes to ultimate fatigue in this area of the belt.

In contrast to the stress patterns encountered when conventional crown pulleys are employed, the present conveyor avoids continual variation in the stresses applied to the central portion of the belt, and the variations in stresses are confined to the border areas of the belt where load-carrying wear is not encountered to any appreciable extent.

Figure 13:
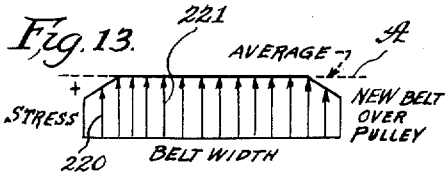
FIG. 13 is a schematic view showing stresses in a new belt passing over the pulley in the conveyor of this invention.
Figure 14:
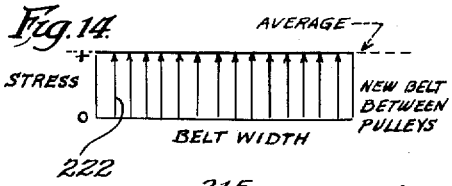
FIG. 14 is a view showing the stresses in such a new belt between pulleys.

In FIG. 13 the stresses that are present in a new belt passing over the pulley 10 have been indicated, and it will be noted that while the stresses near the edges of the belt are somewhat less than the average stress A, the stresses in the intermediate portion of the belt, as indicated at 221 are all equal or uniform and are just slightly greater than the average tension A. In FIG. 14 the stresses in the intermediate portions of such a new belt are indicated at 222 and are uniform across the entire width of the belt.

Figure 15:
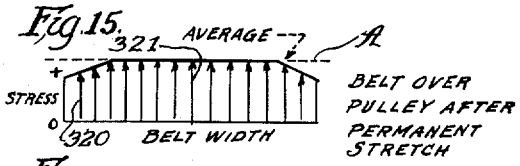
FIG. 15 is a schematic view showing the stresses in the belt passing over a pulley in a conveyor of this invention after the belt has assumed a permanent stretch.
Figure 16:
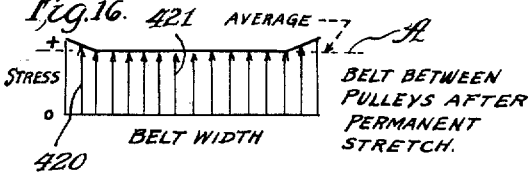
FIG. 16 is a view showing the stresses of the belt of FIG. 15 between pulleys.

After the belt has assumed a permanent stretch as determined by the rim form of the pulley 10, different stress patterns are assumed, as indicated in FIGS. 15 and 16. In FIG. 15, which shows the stress pattern of such a belt at the pulley 10, the average stress A is the same, while in the intermediate portions of the pulley that are opposite the cylindrical surface C of the pulley, the stresses 321 are but slightly greater than the average, while the stresses in the border portions of the belt, as indicated at 320, are below the average A, and are somewhat greater than the stresses 220 that are encountered in this area of a new belt where the belt passes over the pulley.

In FIG. 16, the stress pattern between the pulleys after the permanent stretch has been attained is shown, and here the intermediate portions of the belt that are opposite the cylindrical portions C have stresses 421 applied thereto that are uniform across the intermediate portion of the belt and are just slightly less than the average A. At the edge portions of the belt, the stresses 420 are greater than the average.

Thus, a consideration of FIGS. 15 and 16 demonstrates that in the central portions of a permanently stretched belt, the stresses are varied to but a slight extent above and below the average A, and this variation of a stress is uniform across the width of the intermediate portion of the belt. The only substantial stress variations that occur in the normal running of the belt under this invention, as illustrated by FIGS. 15 and 16, are confined to the edge portions of the belt where the wear due to the carrying and impact of the load is at the minimum.

When a belt in a conveyor of this invention shifts to a misaligned position, the variations and stresses are similarly confined to the border portions of the belt, such variation of course being extended slightly toward the center line of the belt as determined by the extent of the misalignment. Thus, the destruction variations in belt stresses in the conveyor of this invention are minimized, and are confined to those areas of the belt where the load-carrying wear is not ordinarily encountered.

A self-training conveyor belt also has fatigue-producing stresses introduced therein by reason of the lateral flexure of the belt, and while such flexure is inherent in the attainment of a self-training action, certain of the flexural stresses have under the present invention been eliminated. In this connection it must be recognized that as the belt 15 passes in one direction or the other between one of the end pulleys 10 and the adjacent carrier 17, the cross sectional form of the belt is changed, and is in a sense inverted where the belt is shaped to a trough by the carrier 17. Thus the belt passes through a zone of transition where lateral flexure of the belt must take place.

In a conveyor where the usual crown pulleys are employed such transition changes the belt from outwardly convex form to an inwardly or downwardly convex form, and depending upon the lateral stiffness of the belt, the belt is subjected to fatiguing forces which contribute in a measure to the ultimate failure of the belt. These stresses, where conventional crown pulleys are used, are developed throughout the entire width of the belt, but in contrast to this, the present invention limits the stresses developed in such lateral flexure to the marginal portions of the belt which are not subjected to the stresses and wearing forces of the load. In other words, under the present invention, the flat central portion of the belt that rides on the cylindrical surface C of the pulley 10 is not subjected to the inversion of the cross sectional form, and hence one of the factors which normally contributes to ultimate failure of the belt has been eliminated through the different manner of cooperation of the belt with the pulleys of the conveyor.

As pointed out hereinbefore, the single taper form of the sloping surfaces S constitutes the most simple form or embodiment of the present invention and for simplicity, the training forces involved have been first explained by comparison of this simple form with prior art tapered conveyor pulleys. However, under the present inventive concept, and particularly as embodied in the double or compound tapered surface of FIG. 6 or the radius crown of FIG. 7, it is possible to attain an even more effective training effect, and to accomplish this with but slight and inconsequential stretching of the belt over and above the stretching that takes place with single taper form of the invention.

Thus, in the form of the slope S as shown in FIG.6, a compound taper is used. The sloping surface, as thus provided, includes the first frusto-conical surface $S_1$ of one slope extended from the edge E, and the second frusto-conical surface $S_2$ that has a less slope and merges with a gradual radius at its opposite ends with the slope $S_1$ and the adjacent end of the cylindrical surface C. Preferably the surface $S_1$ is slightly wider than the surface $S_2$ so that when the belt 15 is running in its centered relation only a very narrow portion thereof will be running in engagement with the steeper slope $S_1$.

The compound tapered surfaces that are thus provided produce resultant centering forces that increase rapidly as lateral displacement of the belt increases. This result follows because as lateral displacement occurs, the belt almost immediately runs off of the steep slope $S_1$ on one side of the pulley and becomes further engaged with the steep slope $S_1$ at the other side. Then, if further lateral displacement occurs, it is the steeper slope $S_1$ that becomes progressively more effective in creating the desired centering or training forces so that the net result of the compound taper is to produce an unusual effective training action on the belt. A similar action is attained where the sloping edge surfaces S are formed as radius crown surfaces $S_3$, FIG. 7, for here again the slope becomes steeper as it approaches the pulley edge E, and hence progressively more effective training forces are attained produced as undesired belt displacement is encountered.

This attainment of highly effective belt-training forces has been accomplished under the present invention in such a way that there is a radical reduction in the amount of stretch that is required in the belt. Thus in FIG. 4 of the drawings, the "normal radial stretch" that is required in the belt with the prior art tapered conveyor pulley has been graphically illustrated and indicated, and similarly in FIG. 5, the "normal radial stretch" that is required in the belt with the novel pulley of this invention has been graphically illustrated. In FIG. 5, a graphic illustration has also been included showing the marked reduction in the radial stretch required in the belt, and this of course varies depending upon the slope of the training surfaces. The longitudinal stretch of the belt in each instance is a function of the radial stretch. The marked reduction in belt stretch under the present invention materially reduces wear on the belt and increases the useful life of the belt, and while attaining this advantageous result, the pulley of the present invention attains greater and more sensitive training control than has been attained with prior tapered conveyor pulleys.

The pulley rim 11 that is thus provided under the present invention is one that has great advantages insofar as manufacture may be concerned since it may be made by relatively simple forming operations from commercially available metal tubing of the desired diameter and wall thickness. The diameter of the tubing is chosen to correspond with the desired diameter of the cylindrical portion C of the rim, and since tubing is commercially available with accurately formed cylindrical outer surfaces, the major portion of the tubing member requires no working or machining operations. The primary working or forming operations that are required are concerned with the formation of the sloping surfaces S, or $S_1$ and $S_2$ and $S_3$, and these sloping surfaces may be produced through the use of relatively simple swaging dies. In forming the radius crown S, a swaging die having correspondingly curved or arcuate surfaces may be used, while in the formation of the sloping surfaces S, or $S_1$ and $S_2$, the dies may be formed with truly frustoconical surfaces so as to minimize the cost thereof. It has been found that in use such dies produce merging portions of gradual radius at the junctures of the portions $S_1$, and $S_2$ and C. *It is obvious that if the same swaging dies are used in making pulleys of a given diameter but of varying length, the ratio of the constant diameter mid-section to the crowned or tapered marginal surfaces will vary, but it is always contemplated that the constant diameter mid-section will constitute the major portion of the axial length of the pulley.*

The transverse webs 12 may be in the form of sheet metal stampings, and these stampings are put in place within the rim prior to the completion of the final swaging operation so that the outer edges of the web or stamping may thereafter be welded as at 12W to the inner surfaces of the rim adjacent to the other ends thereof.

The stampings or web 12 have central openings 12C formed therein in which the hubs 13 are mounted. The hub structures as herein shown are provided by inner and outer split tapered sleeves 113–1 and 113–2 that have radial slots cut therethrough so that the sleeves may be altered as to diameter by pushing the two sleeves endwise toward each other. This is accomplished by an inside clamping plate 213–1 and an outside clamping plate 213–2 that engage the respective split sleeves so that the sleeves may be urged endwise of each other by drawing the plates together. Bolts 113B are extended through appropriate openings in the web 12 for accmplishing this clamping action, and when the tapered sleeves are drawn together, the outer sleeve is expanded into firm contact with the central openings 12C while the inner sleeve is clamped tightly on a mounting shaft. It will be understood that other forms of hubs may be used if desired.

It will be recognized that self-training pulleys embodying the present invention may be made in any of the wide variety of sizes required in conveyor work and the like, and it will also be recognized that the slope of the crown surfaces may be varied if desired, the slope being increased of course where a great training force is desired and being reduced where a smaller force will suffice. In every instance, however, the cylindrical portion of the pulley constitutes a major portion of the outer on belt-engaging surface of the pulley and this proportion is in a way, determined by the selection of the added width that is to be incorporated in the pulley over and above the width of the belt with which it is to be used. Such selection of the relative widths of the belt and the pulley varies to some extent in the art according to individual preferences of designers, but in every instance the excess width of the pulley is maintained sufficiently large to allow for substantial lateral displacement of the belt without causing the edge of the belt to run beyond the edge of the pulley.

As an example, a 20 inch belt is usually considered to require a pulley width of 26″, and in this pulley width a pulley diameter of 20″ may well be adopted. When this proportioning or relationship of the belt and pulley widths have been determined, the optimum width of the sloping surfaces S of the pulley of this invention for attaining the maximum rate of training response is determined as being equal to the difference between the pulley width and the belt width. In this particular instance, this would indicate that the sloping surfaces S at each side of the pulley should be 6″ in width. The width of the sloping surface may, of course, be increased somewhat beyond the value thus determined, but such increase does not in any way increase the efficiency of the training action that is attained and actually introduces additional stretch into the belt which is not required. Similarly, the width of the sloping surfaces S may be decreased somewhat from the value that is thus determined, but this will cause the pulley to operate with a somewhat reduced efficiency insofar as its corrective or training action and rate of action may be concerned.

Figure 17:
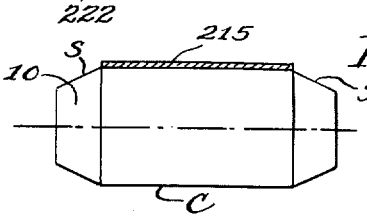
FIG. 17 is a view showing one end of an alternative conveyor embodying the invention.

As a further example of the possible variations of relative belt and pulley width, I have, in FIG. 17, shown a pulley 10 as hereinbefore described with a cooperating belt 215 having a width exactly equal to the width of the cylindrical portion C of the pulley. With such a relation of the belt width to the pulley 10, no training forces are developed so long as the belt maintains its aligned or centered relation, but when misalignment occurs, one edge or border portion of the belt rides onto one of the sloping surfaces S so that restoring or training forces are developed as hereinbefore described. In this instance, however, the training response is not as fast as in the embodiments where both edges of the belt are subjected to the opposite actions of the two sloping surfaces S, but where a rapid response rate is not vital, this belt width relationship may be employed to advantage.

From the foregoing description it will be apparent that the present invention provides a self-training conveyor pulley that is extremely simple in structure and which may be manufactured economically, and it will also be apparent that this invention enables the desired self-training of conveyor belts to be attained with a marked reduction in the stretch or distortion of the belts so that the belts have a longer useful life.

It will be apparent of course that even though the excessive and harmful stretching and stress variations in the belts that heretofore have been encountered have been reduced to a marked degree, the effective belt-training forces that are attained with the pulley of the present invention are of relatively great magnitude so that a highly effective training action is attained.

Thus, while I have illustrated and described preferred embodiments of my invention it is to be understood that changes and variations may be made by those skilled in the art without departing from the spirit and scope of the appended claims.

I claim:

1. In a belt conveyor, the combination of a stretchable, non-metallic belt having a *substantially* flat surface on at least one side of the belt and a belt-training pulley having a rim in engagement with said flat surface of the belt with the belt being tensioned and sufficiently stretched so that substantially the entire width of the belt is in running engagement with the rim of the pulley *and with a substantial wrap around the pulley,* said rim having its mid-section of constant diameter and constituting the major portion of the axial length of the rim, and having tapered portions flanking said mid-section of gradually decreasing diameter, the axial length of the rim being greater than the width of the belt, and the width of the belt being at least substantally equal to said mid-section of the rim.

2. The combination as set forth in claim 1 in which said flanking portions are of stubstantially equal axial length and the width of the belt is greater than the axial length of said mid-section by an amount corresponding substantially to the axial length of one of said flanking portions.

3. The combination as set forth in claim 1 in which said flanking portions are of substantially equal axial length and extend substantially to the adjacent ends of the rim.

4. The combination as set forth in claim 1 in which said flanking portions have a straight inward taper.

5. The combination as set forth in claim 1 in which said flanking portions have a compound inward taper.

6. The combination as set forth in claim 1 in which said flanking portions have an inwardly curved taper.

*7. In a belt conveyor, the combination of a stretchable, non-metallic belt having a substantially flat surface on at least one side of the belt and a belt-training pulley having a rim in engagement with said flat surface of the belt with the belt being tensioned and sufficiently stretched so that substantially the entire width of the belt is in running engagement with the rim of the pulley and with a substantial wrap around the pulley, said rim being of substantially uniform wall thickness throughout the axial length of the pulley and having its mid-section of constant diameter and constituting the major portion of the axial length of the rim, and having tapered portions flanking said mid-section of gradually decreasing diameter, the axial length of the rim being greater than the width of the belt, and the width of the belt being at least substantially equal to said mid-section of the rim.*

*8. In a belt conveyor, the combination of an endless, stretchable, non-metallic belt having a substantially flat surface on at least one side of the belt, a plurality of pulleys about which said belt is trained including a belt-aligning pulley having a rim in engagement with the said flat surface of the belt and with the belt having a substantial wrap around said belt-aligning pulley, belt tensioning means for tensioning said belt about said belt-aligning pulley with sufficient force so that the entire width of the belt is stretched into firm, running engagement with said self-aligning pulley, said rim having its mid-section of constant diameter and constituting the major portion of the axial length of the rim and having tapered portions flanking said mid-section of gradually decreasing diameter, the axial length of the rim being greater than the width of the belt and the width of the belt being greater than the axial length of said constant diameter mid-section.*

*9. A belt conveyor, as set forth in claim 8, in which said tapered positions of the rim of the belt-aligning pulley have progressively decreasing diameter as the end of the pulley is approached.*

References Cited in the file of this patent
or the original patent
UNITED STATES PATENTS

| | | |
|---|---|---|
| 2,304,843 | Nordquist | Dec. 15, 1942 |
| 2,736,205 | Dunne | Feb. 28, 1956 |
| 2,749,157 | Dennison | June 5, 1956 |
| 2,847,114 | Orr | Aug. 12, 1958 |
| 2,897,955 | Morrow | Aug. 4, 1959 |